(12) United States Patent
Igari

(10) Patent No.: US 11,628,814 B2
(45) Date of Patent: Apr. 18, 2023

(54) CONTROLLER AND CONTROL METHOD FOR CONTROLLING BEHAVIOR OF MOTORCYCLE

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 17/256,311

(22) PCT Filed: Jun. 17, 2019

(86) PCT No.: PCT/IB2019/055017
§ 371 (c)(1),
(2) Date: Dec. 28, 2020

(87) PCT Pub. No.: WO2020/035748
PCT Pub. Date: Feb. 20, 2020

(65) Prior Publication Data
US 2021/0261108 A1  Aug. 26, 2021

(30) Foreign Application Priority Data

Jun. 29, 2018  (JP) .............................. JP2018-123800

(51) Int. Cl.
*B60T 8/00* (2006.01)
*B60T 8/26* (2006.01)
(Continued)

(52) U.S. Cl.
CPC ................ *B60T 8/261* (2013.01); *B60T 7/12* (2013.01); *B60T 8/1706* (2013.01);
(Continued)

(58) Field of Classification Search
CPC ...... B60T 8/1706; B60T 8/261; B60T 8/3225; B60T 2201/022; B60T 2260/02;
(Continued)

(56) References Cited

U.S. PATENT DOCUMENTS

2012/0205210 A1* 8/2012 Takenouchi .......... B60T 8/1706
                                                           701/70
2017/0080938 A1* 3/2017 Ohashi .................. B60W 30/16
(Continued)

FOREIGN PATENT DOCUMENTS

DE    102006011573 A1    10/2007
EP       1804042 A1       7/2007
(Continued)

OTHER PUBLICATIONS

International Search Report and Written Opinion for Application No. PCT/IB2019/055017 dated Sep. 10, 2019 (9 pages).

*Primary Examiner* — Truc M Do
(74) *Attorney, Agent, or Firm* — Michael Best & Friedrich LLP

(57) ABSTRACT

A controller for a motorcycle includes a mode change section that changes a mode to a first mode in a state where a temperature of a rear-wheel friction brake mechanism is lower than a first prescribed temperature and to a second mode in a state where the temperature of the rear-wheel friction brake mechanism is higher than the first prescribed temperature during automatic deceleration in the automatic cruise operation. In the case where the braking forces generated on the rear wheel in the first mode and the second mode are compared under a condition that the same deceleration is generated in the motorcycle by the automatic deceleration, in a state where the deceleration is at least less than a first reference amount, the braking force generated on the rear wheel in the second mode is smaller than the braking force generated on the rear wheel in the first mode.

7 Claims, 6 Drawing Sheets

(51) Int. Cl.
*B60T 7/12* (2006.01)
*B60T 8/17* (2006.01)
*B60T 8/32* (2006.01)
*B62L 3/00* (2006.01)
*B60K 31/00* (2006.01)

(52) U.S. Cl.
CPC .............. *B60T 8/3225* (2013.01); *B62L 3/00* (2013.01); *B60K 31/00* (2013.01); *B60T 2201/02* (2013.01); *B60T 2250/00* (2013.01)

(58) Field of Classification Search
CPC .......... B60T 7/12; B60T 7/22; B60T 8/17554; B60T 8/328; B60T 8/885; B60T 13/741; B60T 17/221; B60T 2201/02; B60T 2230/03; B60T 2250/00; B60T 2270/406; B60T 2270/414; B60T 7/06; B60T 7/102; B60T 8/171; B60T 8/172; B60T 8/1766; B62L 3/00; B62L 3/02; B62L 3/08; B60Y 2200/12

See application file for complete search history.

(56) References Cited

U.S. PATENT DOCUMENTS

2017/0297573 A1  10/2017  Fraser et al.
2019/0248367 A1*  8/2019  Knitt .................... B60W 50/14

FOREIGN PATENT DOCUMENTS

| JP | 2008179272 A | 8/2008 |
| JP | 2009116882 A | 5/2009 |
| WO | 0222417 A1 | 3/2002 |

\* cited by examiner

[FIG. 1]
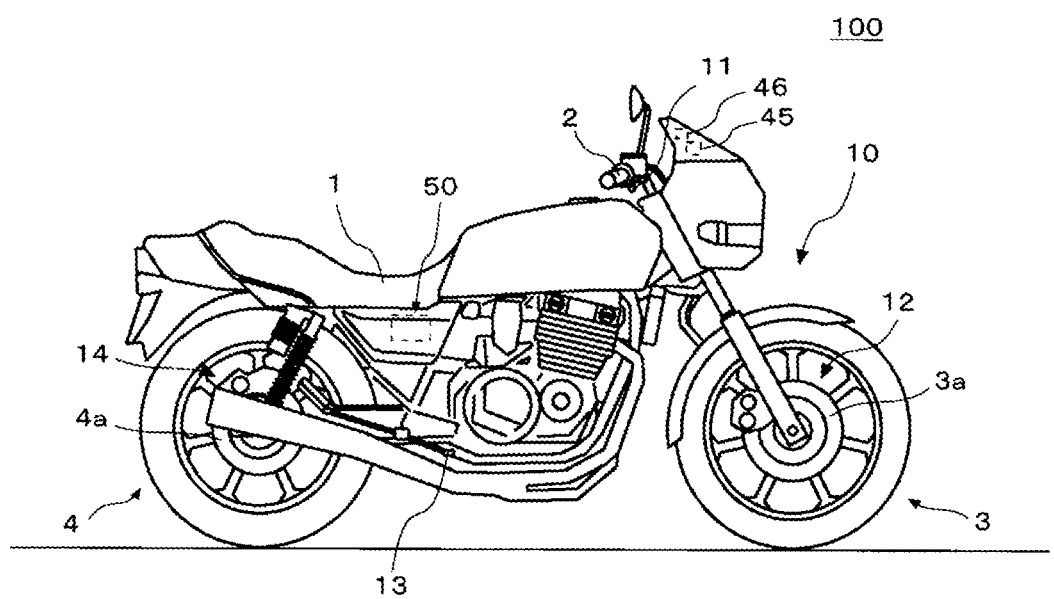

[FIG. 2]
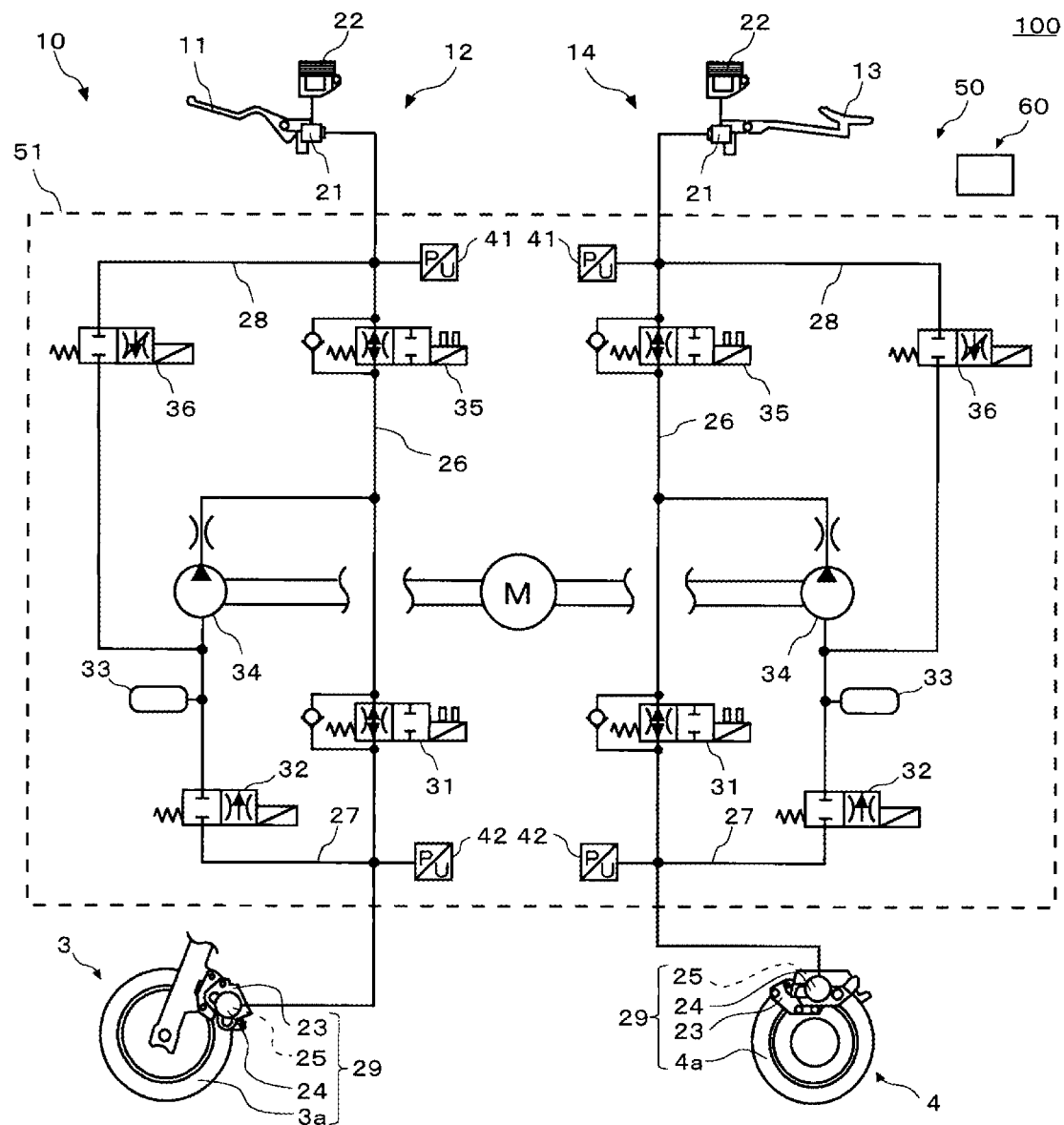

[FIG. 3]
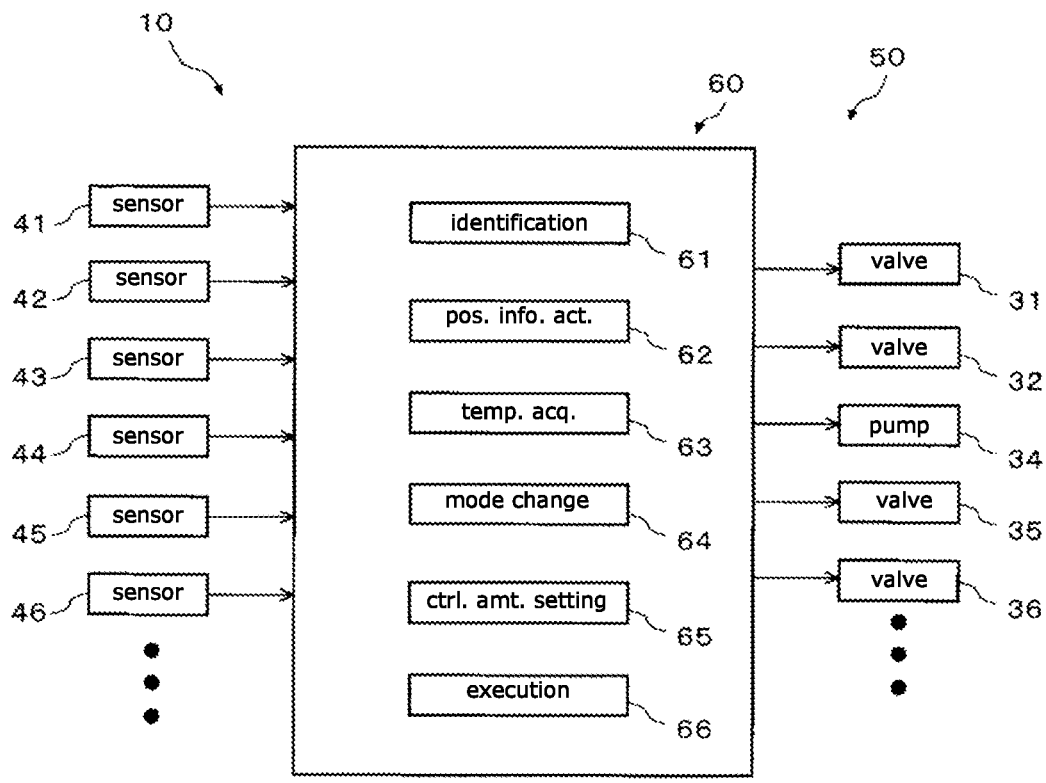
[FIG. 4]
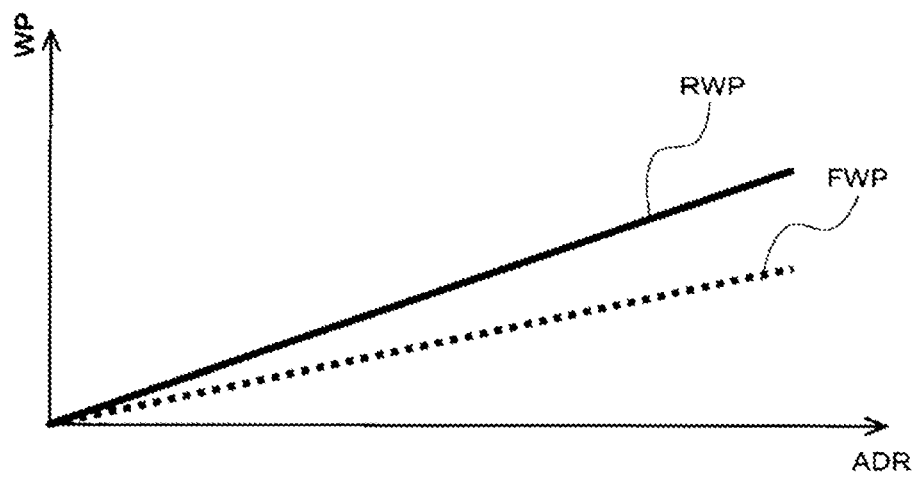

[FIG. 5]
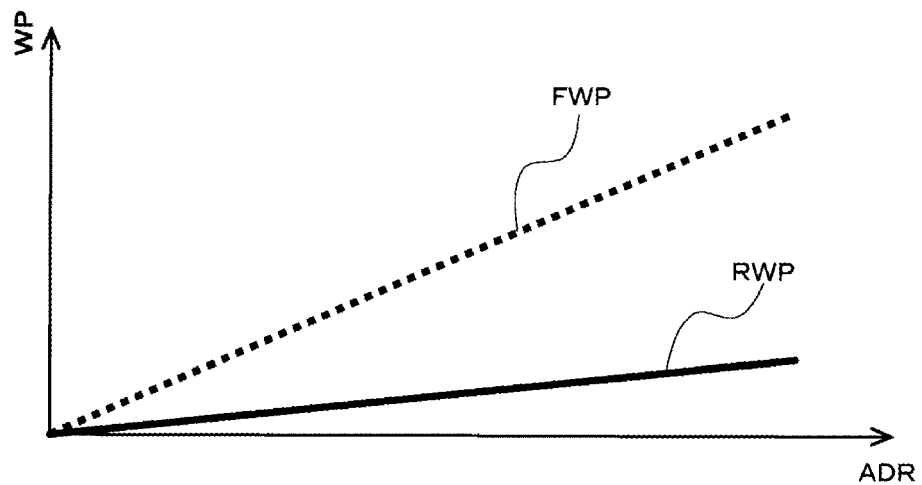
[FIG. 6]
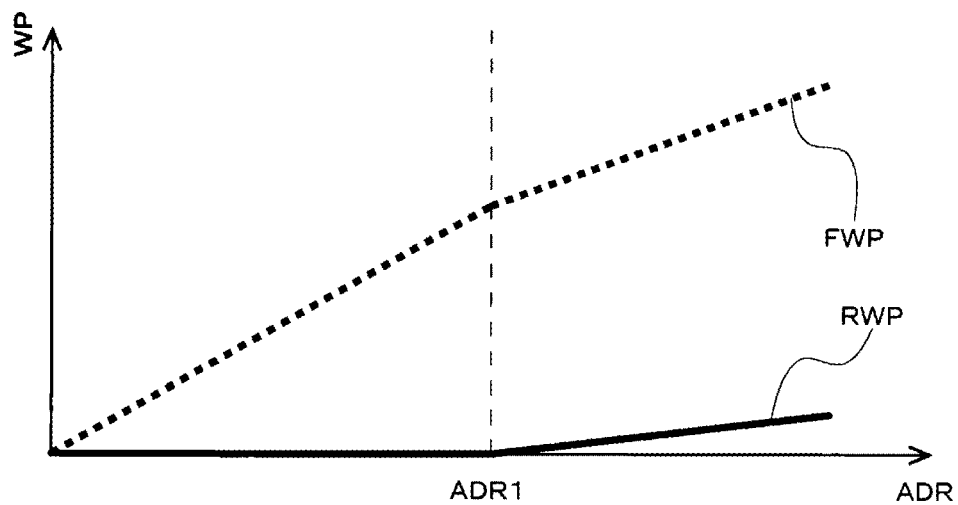
[FIG. 7]
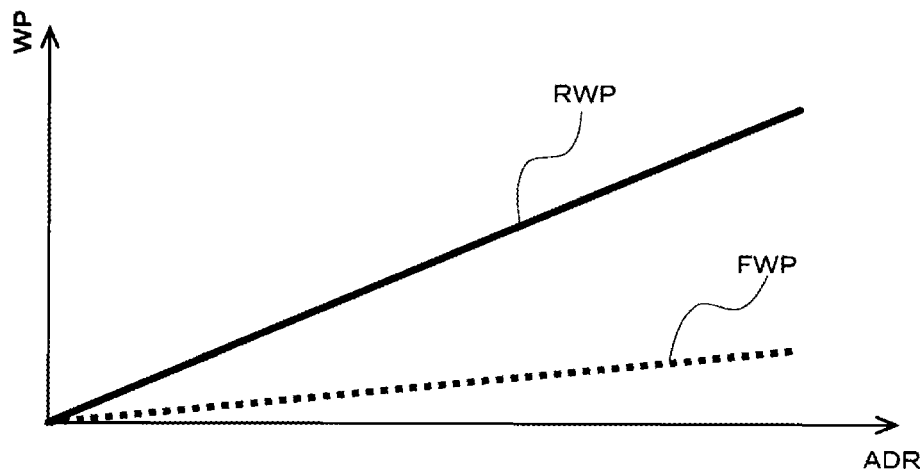

[FIG. 8]
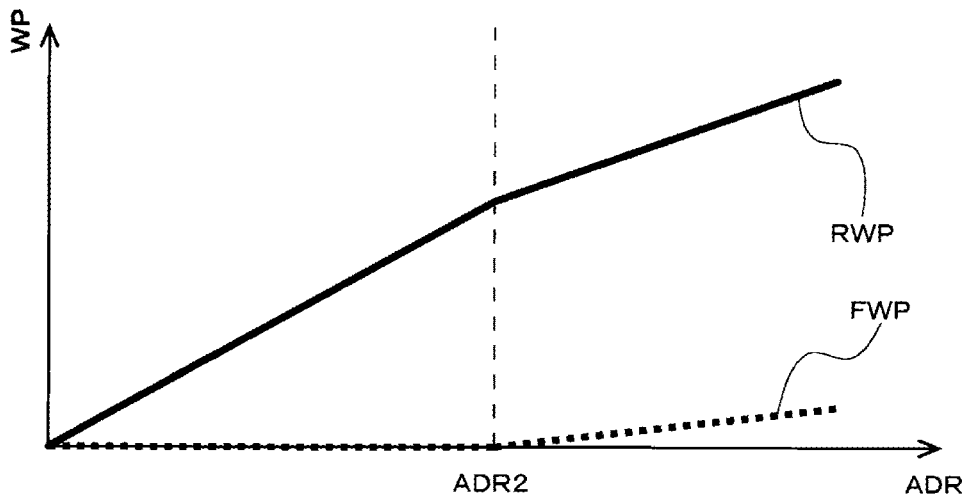
[FIG. 9]
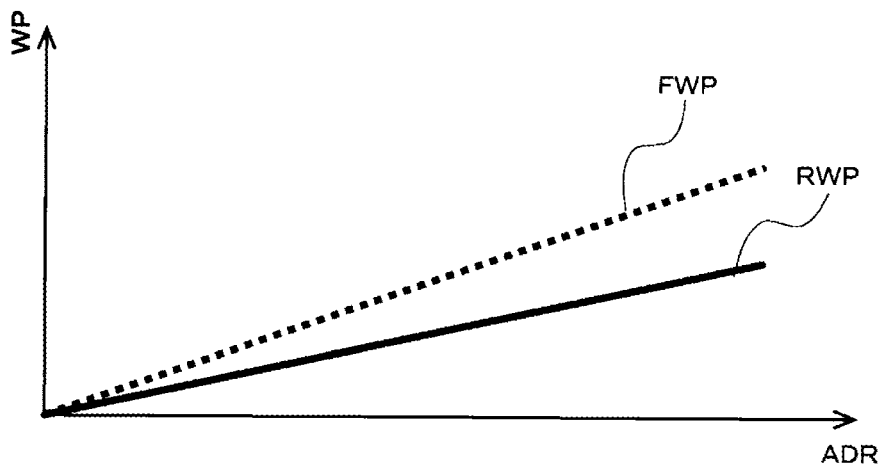
[FIG. 10]
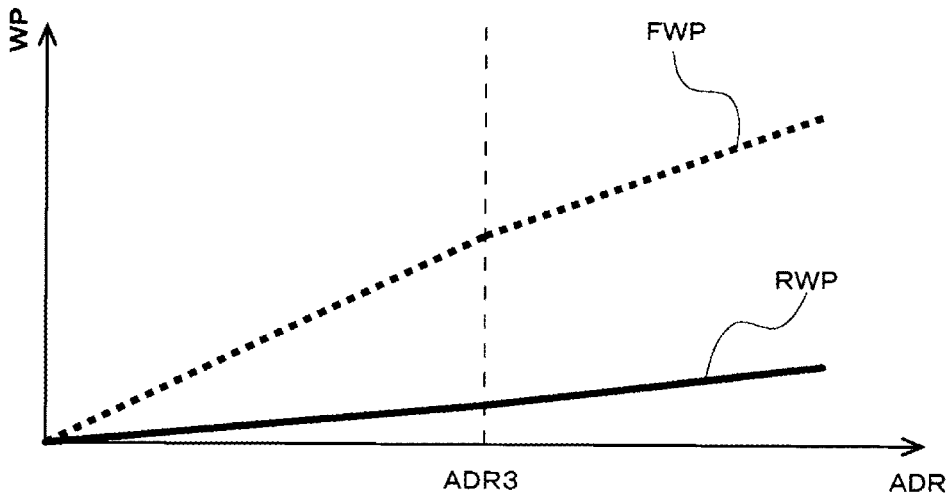

[FIG. 11]
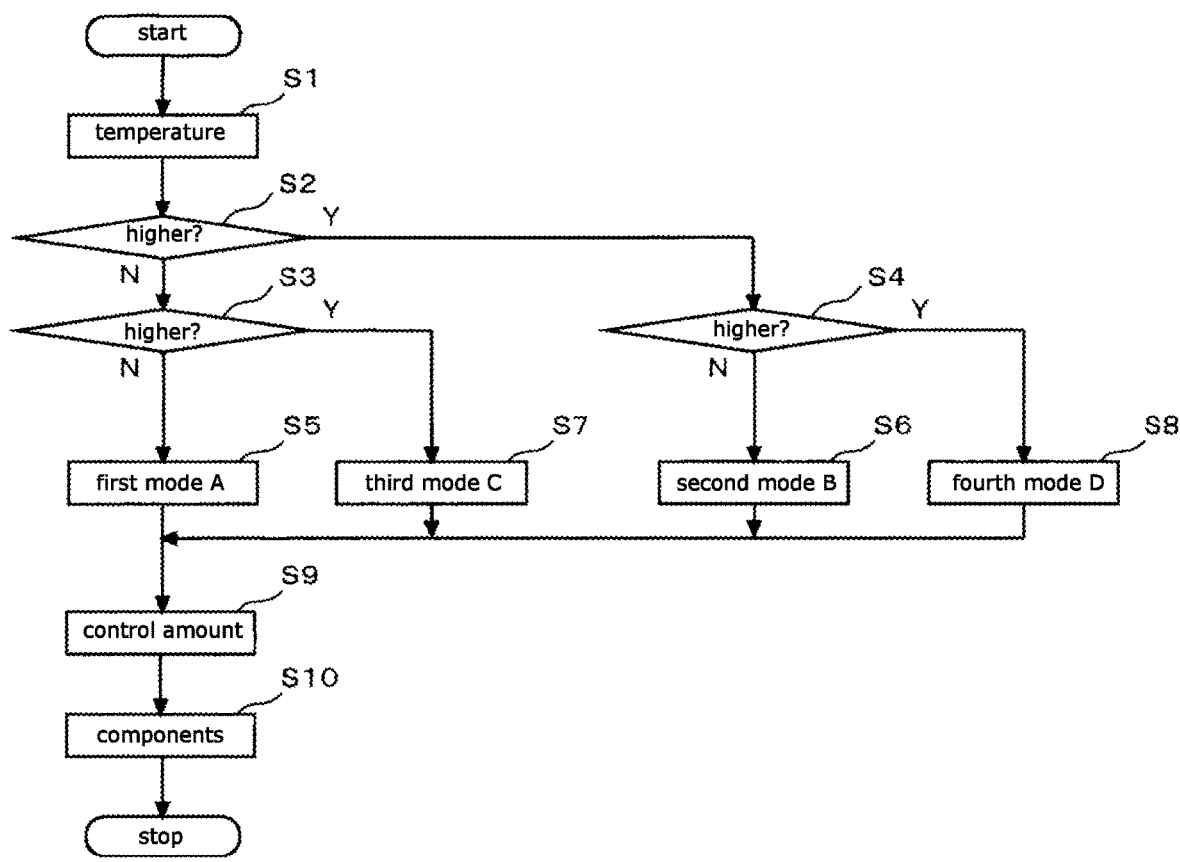

CONTROLLER AND CONTROL METHOD FOR CONTROLLING BEHAVIOR OF MOTORCYCLE

BACKGROUND OF THE INVENTION

The present invention relates to a controller and a control method capable of appropriately assisting with an operation of a motorcycle by a rider.

As a conventional technique related to a motorcycle (a two-wheeled motor vehicle or a three-wheeled motor vehicle), a technique of assisting with a rider's operation has been available. For example, a driver assistance system is disclosed in JP-A-2009-116882. Based on output of a sensor that detects an obstacle present in a travel direction or substantially in the travel direction, the driver assistance system warns the rider of the motorcycle that the motorcycle inappropriately approaches the obstacle.

By the way, in order to assist with the rider's operation, it is considered to make the motorcycle execute automatic cruise operation. In the automatic cruise operation, behavior of the motorcycle is controlled such that a travel speed of the motorcycle approximates a speed reference value. In addition, in adaptive cruise operation that is a mode of the automatic cruise operation, a preceding vehicle on a lane where the motorcycle travels is identified as a follow-up vehicle, relative position information between the motorcycle and the follow-up vehicle is acquired, and the behavior of the motorcycle is controlled such that a distance from the motorcycle to the follow-up vehicle approximates a distance reference value.

Here, the automatic cruise operation that is executed in wide vehicles (for example, passenger vehicles, trucks, and the like having four wheels) has already been widespread, and various techniques therefor have already been established. Meanwhile, the technique related to the automatic cruise operation executed in the motorcycle has not been established. For example, due to a structure in which a rear wheel is provided at a center in a vehicle width direction and the like, the motorcycle has such tendency that heat dissipation property of a friction brake mechanism in the rear wheel is deteriorated in comparison with the wide vehicle. Continuous generation of a high braking force by the friction brake mechanism in the rear wheel in a high-temperature state possibly causes failure of the friction brake mechanism.

SUMMARY OF THE INVENTION

The present invention has been made with the above-described problem as the background and therefore obtains a controller and a control method capable of executing automatic cruise operation that suppresses failure of a friction brake mechanism for a rear wheel.

Solution to Problem

The present invention is a controller that controls behavior of a motorcycle, includes: a control amount setting section that sets a control amount in automatic cruise operation; and an execution section that makes the motorcycle execute the automatic cruise operation corresponding to the control amount set in the control amount setting section, and further includes: a mode change section that changes a mode to a first mode in a state where a temperature of a rear-wheel friction brake mechanism as a friction brake mechanism for a rear wheel of the motorcycle is lower than a first prescribed temperature or to a second mode in a state where the temperature of the rear-wheel friction brake mechanism is higher than the first prescribed temperature during automatic deceleration in the automatic cruise operation. The control amount setting section changes the control amount in accordance with the mode change in the mode change section. In the case where a braking force generated on the rear wheel in the first mode and the braking force generated on the rear wheel in the second mode are compared under a condition that the same deceleration is generated in the motorcycle by the automatic deceleration, in a state where the deceleration is at least less than a first reference amount, the braking force generated on the rear wheel in the second mode is smaller than the braking force generated on the rear wheel in the first mode.

In addition, the present invention is a control method for controlling behavior of a motorcycle, and includes: a control amount setting step to set a control amount in automatic cruise operation; and an execution step to cause the motorcycle to execute the automatic cruise operation corresponding to the control amount set in the control amount setting step, and further includes: a mode change step to change a mode to a first mode in a state where a temperature of a rear-wheel friction brake mechanism as a friction brake mechanism for a rear wheel of the motorcycle is lower than a first prescribed temperature or to a second mode in a state where the temperature of the rear-wheel friction brake mechanism is higher than the first prescribed temperature during automatic deceleration in the automatic cruise operation. In the control amount setting step, the control amount is changed in accordance with the mode change in the mode change step. In the case where a braking force generated on the rear wheel in the first mode and a braking force generated on the rear wheel in the second mode is compared under a condition that the same deceleration is generated in the motorcycle by the automatic deceleration, in a state where at least the deceleration is less than a first reference amount, the braking force generated on the rear wheel in the second mode is smaller than the braking force generated on the rear wheel in the first mode.

Advantageous Effects of Invention

According to the present invention, in the automatic cruise operation, in the case where the motorcycle is automatically decelerated in the state where the temperature of the rear-wheel friction brake mechanism is higher than the prescribed temperature, the braking force generated on the rear wheel is reduced. In this way, a temperature increase of the rear-wheel friction brake mechanism can be suppressed. Therefore, in the present invention, it is possible to execute the automatic cruise operation that suppresses failure of the rear-wheel friction brake mechanism.

BRIEF DESCRIPTION OF DRAWINGS

FIG. 1 is a view of a configuration of a motorcycle on which a behavior control system according to an embodiment of the present invention is mounted.

FIG. 2 is a view of a configuration of the behavior control system according to the embodiment of the present invention.

FIG. 3 is a system configuration diagram of a main section of the behavior control system according to the embodiment of the present invention.

FIG. 4 is an explanatory graph illustrating an example of braking forces generated on a front wheel and a rear wheel in a first mode of the behavior control system according to the embodiment of the present invention.

FIG. 5 is an explanatory graph illustrating an example of the braking forces generated on the front wheel and the rear wheel in a second mode of the behavior control system according to the embodiment of the present invention.

FIG. 6 is an explanatory graph illustrating an example of the braking forces generated on the front wheel and the rear wheel in the second mode of the behavior control system according to the embodiment of the present invention.

FIG. 7 is an explanatory graph illustrating an example of the braking forces generated on the front wheel and the rear wheel in a third mode of the behavior control system according to the embodiment of the present invention.

FIG. 8 is an explanatory graph illustrating an example of the braking forces generated on the front wheel and the rear wheel in the third mode of the behavior control system according to the embodiment of the present invention.

FIG. 9 is an explanatory graph illustrating an example of the braking forces generated on the front wheel and the rear wheel in a fourth mode of the behavior control system according to the embodiment of the present invention.

FIG. 10 is an explanatory graph illustrating an example of the braking forces generated on the front wheel and the rear wheel in the fourth mode of the behavior control system according to the embodiment of the present invention.

FIG. 11 is a flowchart illustrating operation of a controller in the behavior control system according to the embodiment of the present invention.

DETAILED DESCRIPTION

A description will hereinafter be made on a controller and a control method according to the present invention by using the drawings.

Note that a term "motorcycle" means a two-wheeled motor vehicle or a three-wheeled motor vehicle of straddle-type vehicles on each of which a rider straddles. In addition, a configuration and operation, which will be described in the following embodiment, merely constitute one example. The present invention is not limited to the configuration and the operation, which will be described in the following embodiment. For example, a description will hereinafter be made on a case where a motorcycle is the two-wheeled motor vehicle; however, the motorcycle may be a three-wheeled motor vehicle (in particular a three-wheeled motor vehicle having two front wheels and one rear wheel). Furthermore, a description will hereinafter be made on a case where a behavior control system has two wheel cylinders; however, the behavior control system may have the wheel cylinders in a different number.

In the drawings, the same or similar members or portions will not be denoted by a reference sign or will be denoted by the same reference sign. A detailed structure will appropriately be illustrated in a simplified manner or will not be illustrated. If it is desired to indicate a component that is not illustrated in the following drawings, a broken lead line is used to indicate such a component.

Embodiment

A description will hereinafter be made on an example of a behavior control system according to an embodiment and a motorcycle on which the behavior control system is mounted.

<Schematic Configuration>

FIG. 1 is a view of a configuration of the motorcycle on which the behavior control system according to the embodiment of the present invention is mounted. FIG. 2 is a view of a configuration of the behavior control system according to the embodiment of the present invention. FIG. 3 is a system configuration diagram of a main section of the behavior control system according to the embodiment of the present invention.

As illustrated in FIG. 1 and FIG. 2, a behavior control system 10 is mounted on a motorcycle 100. The motorcycle 100 includes: a trunk 1; a handlebar 2 that is held by the trunk 1 in a freely turnable manner; a front wheel 3 that is held with the handlebar 2 by the trunk 1 in a freely turnable manner; and a rear wheel 4 that is held by the trunk 1 in a freely rotatable manner.

The behavior control system 10 includes: a front brake operation section 11; a front-wheel brake mechanism 12 that brakes the front wheel 3 in an interlocking manner with at least the front brake operation section 11; a rear brake operation section 13; and a rear-wheel brake mechanism 14 that brakes the rear wheel 4 in an interlocking manner with at least the rear brake operation section 13.

The front brake operation section 11 is provided on the handlebar 2 and is operated by a user's hand. The front brake operation section 11 is a brake lever, for example. The rear brake operation section 13 is provided in a lower portion of the trunk 1 and is operated by a user's foot. The rear brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad 25; a wheel cylinder 24 that is provided in the brake caliper 23; a primary channel 26 through which a brake fluid in the master cylinder 21 is delivered to the wheel cylinder 24; a secondary channel 27 through which the brake fluid in the wheel cylinder 24 is released; and a supply channel 28 through which the brake fluid in the master cylinder 21 is supplied to the secondary channel 27.

An inlet valve (EV) 31 is provided in the primary channel 26. The secondary channel 27 bypasses a portion of the primary channel 26 between the wheel cylinder 24 side and the master cylinder 21 side from the inlet valve 31. The secondary channel 27 is sequentially provided with an outlet valve (AV) 32, an accumulator 33, and a pump 34 from an upstream side. Between an end of the primary channel 26 on the master cylinder 21 side and a portion of the primary channel 26 to which a downstream end of the secondary channel 27 is connected, a first valve (USV) 35 is provided. The supply channel 28 communicates between the master cylinder 21 and a suction side of the pump 34 in the secondary channel 27. A second valve (HSV) 36 is provided in the supply channel 28.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in the unenergized state and is opened in the energized state, for example.

A hydraulic pressure control unit 50 is configured to include: members such as the inlet valves 31, the outlet valves 32, the accumulators 33, the pumps 34, the first valves 35, and the second valves 36; a base body 51 that is provided with those members and is formed with channels constituting the primary channels 26, the secondary channels 27, and the supply channels 28 therein; and a controller (ECU) 60. In the behavior control system 10, the hydraulic pressure control unit 50 is a unit that has a function of controlling a hydraulic pressure of the brake fluid in the wheel cylinder 24, that is, a braking force on the front wheel 3 that is generated by the front-wheel brake mechanism 12 and a braking force on the rear wheel 4 that is generated by the rear-wheel brake mechanism 14.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to the member other than the base body 51.

As illustrated in FIGS. 1 to 3, the behavior control system 10 includes a master-cylinder pressure sensor 41, a wheel-cylinder pressure sensor 42, a front-wheel rotational frequency sensor 43, a rear-wheel rotational frequency sensor 44, a distance measurement sensor 45, and an image sensor 46.

The master-cylinder pressure sensor 41 detects a hydraulic pressure of the brake fluid in the master cylinder 21. The master-cylinder pressure sensor 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

The wheel-cylinder pressure sensor 42 detects the hydraulic pressure of the brake fluid in the wheel cylinder 24. The wheel-cylinder pressure sensor 42 may detect another physical quantity that can substantially be converted into the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational frequency sensor 43 detects a rotational frequency of the front wheel 3. The front-wheel rotational frequency sensor 43 may detect another physical quantity that can substantially be converted into the rotational frequency of the front wheel 3. The rear-wheel rotational frequency sensor 44 detects a rotational frequency of the rear wheel 4. The rear-wheel rotational frequency sensor 44 may detect another physical quantity that can substantially be converted to the rotational frequency of the rear wheel 4.

The distance measurement sensor 45 is attached in a state of facing forward to a front portion of the motorcycle 100. The distance measurement sensor 45 is a radar, a Lidar, an ultrasonic sensor, a stereovision sensor, or the like, for example, and detects a distance and a direction from the motorcycle 100 to an object ahead.

The image sensor 46 is attached in a state of facing forward to the front portion of the motorcycle 100. An image sensor of any type can be adopted as the image sensor 46 in the case where the image sensor can learn a position relationship between a travel lane of the motorcycle 100 and a preceding vehicle. Note that the function of the image sensor 46 may be realized by the distance measurement sensor 45, and thus the image sensor 46 may not be provided.

As illustrated in FIG. 3, the controller 60 includes a follow-up vehicle identification section 61, a vehicle position information acquisition section 62, a temperature acquisition section 63, a mode change section 64, a control amount setting section 65, and an execution section 66. The controller 60 may partially or entirely be constructed of a microcomputer, a microprocessor unit, or the like, may be constructed of a member in which firmware or the like can be updated, or may be a program module or the like that is executed by a command from a CPU or the like, for example.

The controller 60 receives output of the various sensors (the master-cylinder pressure sensor 41, the wheel-cylinder pressure sensor 42, the front-wheel rotational frequency sensor 43, the rear-wheel rotational frequency sensor 44, the distance measurement sensor 45, the image sensor 46, and the like). In addition, the controller 60 outputs a signal to each component of the behavior control system 10 (each component of the hydraulic pressure control unit 50, each component used to control engine output, and the like), so as to control behavior of the motorcycle 100.

More specifically, during normal brake control, the controller 60 controls the inlet valves 31, the outlet valves 32, the first valves 35, and the second valves 36 as follows. The normal brake control is control to generate the braking force, an amount of which corresponds to an operation amount of the front brake operation section 11, on the front wheel 3 when the front brake operation section 11 is operated.

In addition, the normal brake control is control to generate the braking force, the amount of which corresponds to an operation amount of the rear brake operation section 13, on the rear wheel 4 when the rear brake operation section 13 is operated.

During the normal brake control, the controller 60 opens the inlet valves 31, closes the outlet valves 32, opens the first valves 35, and closes the second valves 36. When the front brake operation section 11 is operated in such a state, in the front-wheel brake mechanism 12, the piston (not illustrated) in the master cylinder 21 is pressed to increase the hydraulic pressure of the brake fluid in the wheel cylinder 24, and the brake pad 25, which is provided in the brake caliper 23, is pressed against a rotor 3a of the front wheel 3. In this way, the braking force is generated on the front wheel 3, and the front wheel 3 is thereby braked. Meanwhile, when the rear brake operation section 13 is operated in such a state, in the rear-wheel brake mechanism 14, the piston (not illustrated) in the master cylinder 21 is pressed to increase the hydraulic pressure of the brake fluid in the wheel cylinder 24, and the brake pad 25, which is provided in the brake caliper 23, is pressed against a rotor 4a of the rear wheel 4. In this way, the braking force is generated on the rear wheel 4, and the rear wheel 4 is thereby braked.

In other words, in the behavior control system 10 according to this embodiment, each of the wheels (the front wheel 3 and the rear wheel 4) is braked by a friction brake mechanism 29 that is a mechanism for generating a friction force. The friction brake mechanism 29, which generates the friction force for braking the front wheel 3, includes the rotor 3a of the front wheel 3, the brake caliper 23 of the front-wheel brake mechanism 12, the wheel cylinder 24 of the front-wheel brake mechanism 12, and the brake pad 25 of the front-wheel brake mechanism 12. The friction brake mechanism 29, which generates the friction force for braking the rear wheel 4, includes the rotor 4a of the rear wheel 4, the brake caliper 23 of the rear-wheel brake mechanism 14, the wheel cylinder 24 of the rear-wheel brake mechanism 14, and the brake pad 25 of the rear-wheel brake mechanism 14. Hereinafter, the friction brake mechanism 29 that generates the friction force for braking the front wheel 3 will be referred to as the friction brake mechanism 29 for the front wheel 3. Hereinafter, the friction brake mechanism 29 that generates the friction force for braking the rear wheel 4 will be referred to as the friction brake mechanism 29 for the rear wheel 4.

In the behavior control system 10 according to this embodiment, the friction brake mechanism 29 is of a disc brake type. However, the friction brake mechanism 29 is not limited to that of the disc brake type. For example, in the case where the friction brake mechanism 29 is of a drum brake type, the friction brake mechanism 29 is constructed of a brake drum provided on the wheel, a brake shoe pressed against the brake drum, and the like.

The controller 60 can execute the adaptive cruise operation. The adaptive cruise operation is a mode of automatic cruise operation. In the automatic cruise operation, the engine output and the braking force generated on the wheel (the front wheel 3 and the rear wheel 4) are controlled such that a travel speed of the motorcycle 100 approximates a speed reference value. In this way, the motorcycle 100 is automatically accelerated or automatically decelerated. The adaptive cruise operation is executed when the preceding vehicle is identified as the follow-up vehicle during the execution of the automatic cruise operation. In the adaptive cruise operation, the engine output and the braking force generated on the wheel (the front wheel 3 or the rear wheel 4) are controlled such that the distance from the motorcycle 100 to the follow-up vehicle approximates a distance reference value. As a result, the motorcycle 100 is automatically accelerated or automatically decelerated.

The follow-up vehicle identification section 61 identifies the follow-up vehicle on the basis of the output of the distance measurement sensor 45 and the image sensor 46. More specifically, of the preceding vehicles within a detection range of the distance measurement sensor 45, the preceding vehicle that is located on the travel lane of the motorcycle 100 and has the shortest distance from the motorcycle 100 is identified as the follow-up vehicle.

Based on the output of the distance measurement sensor 45, the vehicle position information acquisition section 62 acquires vehicle position information that is relative position information of the follow-up vehicle with respect to the traveling motorcycle 100. More specifically, the vehicle position information acquisition section 62 acquires, as the vehicle position information, the distance between the motorcycle 100 and the follow-up vehicle in a travel direction of the motorcycle 100.

The temperature acquisition section 63 is a functional section that acquires a temperature of the friction brake mechanism 29 for the front wheel 3 and a temperature of the friction brake mechanism 29 for the rear wheel 4. In this embodiment, the temperature acquisition section 63 acquires, as the temperature of the friction brake mechanism 29 for the front wheel 3, a temperature of the brake pad 25 provided in the brake caliper 23 of the front-wheel brake mechanism 12. In addition, in this embodiment, the temperature acquisition section 63 acquires, as the temperature of the friction brake mechanism 29 for the rear wheel 4, a temperature of the brake pad 25 provided in the brake caliper 23 of the rear-wheel brake mechanism 14. Note that the brake pad 25, which is provided in the brake caliper 23 of the front-wheel brake mechanism 12, will hereinafter be referred to as the brake pad 25 for the front wheel 3. In addition, the brake pad 25, which is provided in the brake caliper 23 of the rear-wheel brake mechanism 14, will hereinafter be referred to as the brake pad 25 for the rear wheel 4.

In detail, the temperature acquisition section 63 uses a detection value of the wheel-cylinder pressure sensor 42 in the front-wheel brake mechanism 12 and a detection value of the front-wheel rotational frequency sensor 43 to calculate the temperature of the brake pad 25 for the front wheel 3. In addition, the temperature acquisition section 63 uses a detection value of the wheel-cylinder pressure sensor 42 in the rear-wheel brake mechanism 14 and a detection value of the rear-wheel rotational frequency sensor 44 to calculate the temperature of the brake pad 25 for the rear wheel 4. A method for calculating the temperature of the brake pad in the wheel on the basis of the hydraulic pressure of the brake fluid in the wheel cylinder and the wheel rotational frequency is a known method as used in the field of four-wheeled motor vehicles and the like, for example. Thus, in this embodiment, a specific description on the method of calculating the temperature of the brake pad 25 for the front wheel 3 and a specific description on the method of calculating the temperature of the brake pad 25 for the rear wheel 4 will not be made.

Note that an arbitrary method can be adopted as the method for acquiring the temperature of the brake pad 25 for the front wheel 3. For example, a temperature sensor may be attached to the brake pad 25 for the front wheel 3, and the temperature of the brake pad 25 for the front wheel 3 may directly be detected. Alternatively, for example, the temperature sensor may be attached to a part that is provided in the vicinity of the brake pad 25 for the front wheel 3 and is affected by the temperature of the brake pad 25 for the front wheel 3. Then, the temperature of the brake pad 25 for the front wheel 3 may be calculated from a detection value of the temperature sensor. Alternatively, for example, the temperature of the brake pad 25 for the front wheel 3 may be calculated on the basis of a pressure of the front wheel 3. In the case where the braking force is generated on the front wheel 3 and the front wheel 3 is thereby braked, the temperature of the brake pad 25 for the front wheel 3 is increased, and a temperature of the front wheel 3 is also increased due to friction between the front wheel 3 and a road surface. Then, along with the temperature increase of the front wheel 3, air in the front wheel 3 is expanded, and the pressure of the front wheel 3 is increased. Thus, the temperature of the brake pad 25 for the front wheel 3 can also be calculated on the basis of the pressure of the front wheel 3. Alternatively, for example, the temperature of the brake pad 25 for the front wheel 3 may be calculated on the basis of the number of use of a brake for the front wheel 3 per unit time. A relative relationship can be found between the number of use of the brake for the front wheel 3 per unit time and the temperature of the brake pad 25 for the front wheel 3. Accordingly, the temperature of the brake pad 25 for the front wheel 3 can also be calculated on the basis of the number of use of the brake for the front wheel 3 per unit time.

In addition, as the temperature of the friction brake mechanism 29 for the front wheel 3, a temperature of the component, which constitutes the friction brake mechanism 29 for the front wheel 3 and is not the brake pad 25, may be acquired as the temperature of the friction brake mechanism 29 for the front wheel 3. The component, which constitutes the friction brake mechanism 29 for the front wheel 3 and is not the brake pad 25, is the rotor 3a, the brake caliper 23, or the like of the front-wheel brake mechanism 12, for example. At this time, an arbitrary method can be adopted as a method for acquiring the temperature of such a component.

Similarly, an arbitrary method is adopted as a method for acquiring the temperature of the brake pad 25 for the rear wheel 4. For example, a temperature sensor may be attached to the brake pad 25 for the rear wheel 4, and the temperature of the brake pad 25 for the rear wheel 4 may directly be detected. Alternatively, for example, the temperature sensor may be attached to a part that is provided in the vicinity of the brake pad 25 for the rear wheel 4 and is affected by the temperature of the brake pad 25 for the rear wheel 4. Then, the temperature of the brake pad 25 for the rear wheel 4 may be calculated from a detection value of the temperature sensor. Alternatively, for example, the temperature of the brake pad 25 for the rear wheel 4 may be calculated on the basis of a pressure of the rear wheel 4. Alternatively, for example, the temperature of the brake pad 25 for the rear wheel 4 may be calculated on the basis of the number of use of a brake for the rear wheel 4 per unit time.

In addition, as the temperature of the friction brake mechanism 29 for the rear wheel 4, a temperature of the component, which constitutes the friction brake mechanism 29 for the rear wheel 4 and is not the brake pad 25, may be acquired as the temperature of the friction brake mechanism 29 for the rear wheel 4. The component, which constitutes the friction brake mechanism 29 for the rear wheel 4 and is not the brake pad 25, is the rotor 4a, the brake caliper 23, or the like of the rear-wheel brake mechanism 14, for example. At this time, an arbitrary method can be adopted as a method for acquiring the temperature of such a component.

The mode change section 64 changes a mode for switching the operation of each of the components of the hydraulic pressure control unit 50 at the time when the automatic deceleration is executed in the adaptive cruise operation. The mode change section 64 may select one of a first mode A, a second mode B, a third mode C, and a fourth mode D, which will be described below, or may select another mode in addition to those. In addition, the mode change section 64 may be configured to change the mode by selecting one of the stored modes, or may be configured to output information for correcting a control amount set in the control amount setting section 65 upon necessary so as to consequently change the mode.

The control amount setting section 65 sets a control amount in the adaptive cruise operation on the basis of the vehicle position information acquired by the vehicle position information acquisition section 62 and the output of each of the front-wheel rotational frequency sensor 43 and the rear-wheel rotational frequency sensor 44. More specifically, the control amount setting section 65 sets such a control amount that the distance between the motorcycle 100 and the follow-up vehicle in the travel direction of the motorcycle 100 approximates the distance reference value. As the distance from the motorcycle 100 to the follow-up vehicle, the distance reference value is set to a value with which the rider's safety can be secured. In addition, the control amount setting section 65 sets such a control amount that the travel speed of the motorcycle 100 does not exceed the speed reference value. For example, the speed reference value can appropriately be set by the rider. Furthermore, in the case where the follow-up vehicle identification section 61 has not identified the follow-up vehicle, the control amount setting section 65 sets such a control amount that the travel speed of the motorcycle 100 approximates the speed reference value.

The execution section 66 executes the adaptive cruise operation that corresponds to the control amount set in the control amount setting section 65. For example, in the adaptive cruise operation, the execution section 66 controls the components of the behavior control system 10 in a manner to increase the engine output, and thereby executes the automatic acceleration. In addition, for example, in the adaptive cruise operation, the execution section 66 controls the components of the behavior control system 10 in a manner to increase the braking forces generated on the wheels (the front wheel 3 and the rear wheel 4), and thereby executes the automatic deceleration. When the automatic deceleration is executed, the execution section 66 operates the inlet valves 31, the outlet valves 32, the first valves, 35, the second valves 36, and the pumps 34 in the control amount set in the control amount setting section 65 and thus to control the deceleration generated in the motorcycle 100.

For example, the controller 60 controls the inlet valves 31, the outlet valves 32, the first valves 35, the second valves 36, and the pumps 34 as follows. In order to generate the braking force on the front wheel 3, the controller 60 drives the pump 34 in a state where the inlet valve 31 is opened, the outlet valve 32 is closed, the first valve 35 is closed, and the second valve 36 is opened in the front-wheel brake mechanism 12. In addition, in order to generate the braking force on the rear wheel 4, the controller 60 drives the pump 34 in a state where the inlet valve 31 is opened, the outlet valve 32 is closed, the first valve 35 is closed, and the second valve 36 is opened in the rear-wheel brake mechanism 14.

Here, the mode change section 64 is configured to select the first mode A or the second mode B so as to change a ratio between the braking force generated on the front wheel 3 and the braking force generated on the rear wheel 4 depending on a temperature state of the rear wheel 4 during the automatic deceleration in the adaptive cruise operation.

FIG. 4 is an explanatory graph illustrating an example of the braking forces generated on the front wheel and the rear wheel in the first mode of the behavior control system according to the embodiment of the present invention. FIG. 5 is an explanatory graph illustrating an example of the braking forces generated on the front wheel and the rear wheel in the second mode of the behavior control system according to the embodiment of the present invention. Note that ADR on a lateral axis in FIG. 4 and FIG. 5 indicates the deceleration during the automatic deceleration. WP on a vertical axis in FIG. 4 and FIG. 5 indicates the hydraulic pressure of the brake fluid in the wheel cylinder 24 that is detected by the wheel-cylinder pressure sensor 42. That is, the vertical axis in each of FIG. 4 and FIG. 5 indicates the braking force generated on the wheel (the front wheel 3 or the rear wheel 4). In addition, a broken line in each of FIG. 4 and FIG. 5 indicates the braking force generated on the front wheel 3, and a solid line in each of FIG. 4 and indicates the braking force generated on the rear wheel 4.

In detail, upon the automatic deceleration, the mode change section 64 selects the first mode A in a state where the temperature of the friction brake mechanism 29 for the rear wheel 4 is lower than a first prescribed temperature. Meanwhile, upon the automatic deceleration, the mode change section 64 selects the second mode B in a state where the temperature of the friction brake mechanism 29 for the rear wheel 4 is higher than the first prescribed temperature. Furthermore, in the case where the braking force generated on the rear wheel 4 in the first mode A and the braking force generated on the rear wheel 4 in the second mode B are compared under a condition that the same deceleration is generated in the motorcycle 100 by the automatic deceleration, the braking force generated on the rear wheel 4 in the second mode B is smaller than the braking force generated on the rear wheel 4 in the first mode A. Note that a magnitude of the braking force generated on the rear wheel 4 can be adjusted, for example, by controlling at least one of a rotational frequency of a drive source (a motor or the like) of the pump 34 in the rear-wheel brake mechanism 14, an opening degree of the inlet valve 31 in the rear-wheel brake mechanism 14, and an open time of the inlet valve 31 in the rear-wheel brake mechanism 14.

Upon the automatic deceleration, the mode change section 64 selects the first mode A or the second mode B as described above. In this way, when the temperature of the friction brake mechanism 29 for the rear wheel 4 is brought into the higher state than the first prescribed temperature, the braking force generated on the rear wheel 4 can be reduced. That is, the temperature increase of the friction brake mechanism 29 for the rear wheel 4 can be suppressed by selecting the second mode B. Accordingly, as a result of the mode change section 64 selecting the first mode A or the second mode B as described above, the temperature increase of the friction brake mechanism 29 for the rear wheel 4 can be suppressed.

Note that, in FIG. 5, it is configured that the braking force is generated on the rear wheel 4 in the second mode B. However, the second mode B illustrated in FIG. 5 is merely one example. For example, in the second mode B, the braking force may not be generated on the rear wheel 4 at all. That is, in the case where the braking force generated on the rear wheel 4 in the first mode A and the braking force generated on the rear wheel 4 in the second mode B are compared under the condition that the same deceleration is generated in the motorcycle 100 by the automatic deceleration, the braking force generated on the rear wheel 4 in the second mode B may be smaller than the braking force generated on the rear wheel 4 in the first mode A.

FIG. 6 is an explanatory graph illustrating an example of the braking forces generated on the front wheel and the rear wheel in the second mode of the behavior control system according to the embodiment of the present invention. Note that a lateral axis and a vertical axis in FIG. 6 are the same as those in FIG. 5. In addition, deceleration ADR1, which is illustrated in FIG. 6, corresponds to a first reference amount in the present invention.

For example, the second mode B may be configured as follows. Under the condition that the same deceleration is generated in the motorcycle 100 by the automatic deceleration, the ratio of the braking force generated on the rear wheel 4 in the first mode A to the braking force generated on the rear wheel 4 in the second mode B is defined as a first ratio. As illustrated in FIG. 6, the first ratio in a state where the deceleration generated in the motorcycle 100 by the automatic deceleration is greater than the deceleration ADR1 is smaller than the first ratio in a state where the deceleration generated in the motorcycle 100 by the automatic deceleration is less than the deceleration ADR1. That is, in the second mode B illustrated in FIG. 6, when the deceleration generated in the motorcycle 100 by the automatic deceleration is brought into the greater state than the deceleration ADR1, a degree of the suppression of the braking force generated on the rear wheel 4 is reduced in comparison with the state where the deceleration generated in the motorcycle 100 by the automatic deceleration is less than the deceleration ADR1.

The second mode B is configured as illustrated in FIG. 6. Accordingly, also in the second mode B to suppress the temperature increase of the friction brake mechanism 29 for the rear wheel 4, the braking force can be generated on the rear wheel 4 when the motorcycle 100 has to be rapidly decelerated. Thus, the safety of the motorcycle 100 is improved. In addition, because the second mode B is configured as illustrated in FIG. 6, in the state where the deceleration generated on the motorcycle 100 at least by the automatic deceleration is less than the deceleration ADR1, the automatic deceleration capable of protecting the friction brake mechanism 29 for the rear wheel 4 can be executed.

The mode change section 64 of the controller 60 is configured to select the third mode C or the fourth mode D during the automatic deceleration in order to suppress the temperature increase of the friction brake mechanism 29 for the front wheel 3.

FIG. 7 is an explanatory graph illustrating an example of the braking forces generated on the front wheel and the rear wheel in the third mode of the behavior control system according to the embodiment of the present invention. Note that a lateral axis and a vertical axis in FIG. 7 are the same as those in FIG. 5.

In detail, when the temperature of the friction brake mechanism 29 for the rear wheel 4 is lower than the first prescribed temperature, the mode change section 64 selects the first mode A in a state where the temperature of the friction brake mechanism 29 for the front wheel 3 is lower than a second prescribed temperature. In addition, when the temperature of the friction brake mechanism 29 for the rear wheel 4 is lower than the first prescribed temperature, the mode change section 64 selects the third mode C in a state where the temperature of the friction brake mechanism 29 for the front wheel 3 is higher than the second prescribed temperature. Furthermore, in the case where the braking force generated on the front wheel 3 in the first mode A and the braking force generated on the front wheel 3 in the third mode C are compared under the condition that the same deceleration is generated in the motorcycle 100 by the automatic deceleration, the braking force generated on the front wheel 3 in the third mode C is smaller than the braking force generated on the front wheel 3 in the first mode A. Note that a magnitude of the braking force generated on the front wheel 3 can be adjusted, for example, by controlling at least one of a rotational frequency of a drive source (a motor or the like) of the pump 34 in the front-wheel brake mechanism 12, an opening degree of the inlet valve 31 in the front-wheel brake mechanism 12, and an open time of the inlet valve 31 in the front-wheel brake mechanism 12.

Upon the automatic deceleration, the mode change section 64 selects the first mode A or the third mode C as described above. In this way, when the temperature of the friction brake mechanism 29 for the front wheel 3 is brought into the higher state than the second prescribed temperature in the state where the temperature of the friction brake mechanism 29 for the rear wheel 4 is lower than the first prescribed temperature, the braking force generated on the front wheel 3 can be reduced. That is, the temperature increase of the friction brake mechanism 29 for the front wheel 3 can be suppressed by selecting the third mode C. Accordingly, as a result of the mode change section 64 selecting the first mode A or the third mode C as described above, the temperature increase of the friction brake mechanism 29 for the front wheel 3 can be suppressed.

Note that, in FIG. 7, it is configured that the braking force is generated on the front wheel 3 in the third mode C. However, the third mode C illustrated in FIG. 7 is merely one example. For example, in the third mode C, the braking force may not be generated on the front wheel 3 at all. That is, in the case where the braking force generated on the front wheel 3 in the first mode A and the braking force generated on the front wheel 3 in the third mode C are compared under the condition that the same deceleration is generated in the motorcycle 100 by the automatic deceleration, the braking force generated on the front wheel 3 in the third mode C only needs to be smaller than the braking force generated on the front wheel 3 in the first mode A.

FIG. 8 is an explanatory graph illustrating an example of the braking forces generated on the front wheel and the rear wheel in the third mode of the behavior control system according to the embodiment of the present invention. Note that a lateral axis and a vertical axis in FIG. 8 are the same as those in FIG. 5. In addition, deceleration ADR2, which is illustrated in FIG. 8, corresponds to a second reference amount in the present invention. The deceleration ADR2 may be equal to or differ from the deceleration ADR1 illustrated in FIG. 6.

For example, the third mode C may be configured as follows. Under the condition that the same deceleration is generated in the motorcycle 100 by the automatic deceleration, a ratio of the braking force generated on the front wheel 3 in the first mode A to the braking force generated on the front wheel 3 in the third mode C is defined as a second ratio. As illustrated in FIG. 8, the second ratio in a state where the deceleration generated in the motorcycle 100 by the automatic deceleration is greater than the deceleration ADR2 is smaller than the second ratio in a state where the deceleration generated in the motorcycle 100 by the automatic deceleration is less than the deceleration ADR2. That is, in the third mode C illustrated in FIG. 8, when the deceleration generated in the motorcycle 100 by the automatic deceleration is brought into the greater state than the deceleration ADR2, a degree of the suppression of the braking force generated on the front wheel 3 is reduced in comparison with the state where the deceleration generated in the motorcycle 100 by the automatic deceleration is less than the deceleration ADR2.

The third mode C is configured as illustrated in FIG. 8. Accordingly, also in the third mode C to suppress the temperature increase of the friction brake mechanism 29 for the front wheel 3, the braking force can be generated on the front wheel 3 when the motorcycle 100 has to be rapidly decelerated. Thus, the safety of the motorcycle 100 is improved. In addition, because the third mode C is configured as illustrated in FIG. 8, in the state where the deceleration generated on the motorcycle 100 at least by the automatic deceleration is less than the deceleration ADR2, the automatic deceleration capable of protecting the friction brake mechanism 29 for the front wheel 3 can be executed.

FIG. 9 is an explanatory graph illustrating an example of the braking forces generated on the front wheel and the rear wheel in the fourth mode of the behavior control system according to the embodiment of the present invention. Note that a lateral axis and a vertical axis in FIG. 9 are the same as those in FIG. 5.

In detail, when the temperature of the friction brake mechanism 29 for the rear wheel 4 is higher than the first prescribed temperature, the mode change section 64 selects the second mode B in a state where the temperature of the friction brake mechanism 29 for the front wheel 3 is lower than a third prescribed temperature. In addition, when the temperature of the friction brake mechanism 29 for the rear wheel 4 is higher than the first prescribed temperature, the mode change section 64 selects the fourth mode D in a state where the temperature of the friction brake mechanism 29 for the front wheel 3 is higher than the third prescribed temperature. Furthermore, in the case where the braking force generated on the front wheel 3 in the second mode B and the braking force generated on the front wheel 3 in the fourth mode D are compared under the condition that the same deceleration is generated in the motorcycle 100 by the automatic deceleration, the braking force generated on the front wheel 3 in the fourth mode D is smaller than the braking force generated on the front wheel 3 in the second mode B. Moreover, in the case where the braking force generated on the rear wheel 4 in the first mode A and the braking force generated on the rear wheel 4 in the fourth mode D are compared under a condition that the same deceleration is generated in the motorcycle 100 by the automatic deceleration, the braking force generated on the rear wheel 4 in the fourth mode D is smaller than the braking force generated on the rear wheel 4 in the first mode A. In the fourth mode D, the braking force generated on the rear wheel 4 is preferably smaller than the braking force generated on the front wheel 3. Note that the third prescribed temperature may be equal to the second prescribed temperature or may differ from the second prescribed temperature.

Upon the automatic deceleration, the mode change section 64 selects the second mode B or the fourth mode D as described above. In this way, when the temperature of the friction brake mechanism 29 for the front wheel 3 is brought into the higher state than the third prescribed temperature in the state where the temperature of the friction brake mechanism 29 for the rear wheel 4 is higher than the first prescribed temperature, the braking force generated on the front wheel 3 can be reduced. That is, the temperature increases of the friction brake mechanism 29 for the rear wheel 4 and the friction brake mechanism 29 for the front wheel 3 can be suppressed by selecting the fourth mode D. Accordingly, as a result of the mode change section 64 selecting the second mode B or the fourth mode D as described above, the temperature increase of the friction brake mechanism 29 for the front wheel 3 can be suppressed.

FIG. 10 is an explanatory graph illustrating an example of the braking forces generated on the front wheel and the rear wheel in the fourth mode of the behavior control system according to the embodiment of the present invention. Note that a lateral axis and a vertical axis in FIG. 10 are the same as those in FIG. 5. In addition, deceleration ADR3, which is illustrated in FIG. 10, corresponds to a third reference amount in the present invention. The deceleration ADR3 may be equal to or differ from the deceleration ADR1 illustrated in FIG. 6, or may be equal to or differ from the deceleration ADR2 illustrated in FIG. 8.

For example, the fourth mode D may be configured as follows. Under the condition that the same deceleration is generated in the motorcycle 100 by the automatic deceleration, a ratio of the braking force generated on the front wheel 3 in the second mode B to the braking force generated on the front wheel 3 in the fourth mode D is defined as a third ratio. As illustrated in FIG. 10, the third ratio in a state where the deceleration generated in the motorcycle 100 by the automatic deceleration is greater than the deceleration ADR3 is smaller than the third ratio in a state where the deceleration generated in the motorcycle 100 by the automatic deceleration is less than the deceleration ADR3. That is, in the fourth mode D illustrated in FIG. 10, when the deceleration generated in the motorcycle 100 by the automatic deceleration is brought into the greater state than the deceleration ADR3, the degree of the suppression of the braking force generated on the front wheel 3 is reduced in comparison with the state where the deceleration generated in the motorcycle 100 by the automatic deceleration is less than the deceleration ADR3.

The fourth mode D is configured as illustrated in FIG. 10. Accordingly, also in the fourth mode D to suppress the temperature increases of the friction brake mechanism 29 for the rear wheel 4 and the friction brake mechanism 29 for the front wheel 3, the braking forces can be generated on the rear wheel 4 and the front wheel 3 when the motorcycle 100 has to be rapidly decelerated. Thus, the safety of the motorcycle 100 is improved. In addition, because the fourth mode D is configured as illustrated in FIG. 10, in the state where the deceleration generated on the motorcycle 100 at least by the automatic deceleration is less than the deceleration ADR3, the automatic deceleration capable of protecting the friction brake mechanism 29 for the rear wheel 4 and the friction brake mechanism 29 for the front wheel 3 can be executed.

<Operation of Controller>

FIG. 11 is a flowchart illustrating the operation of the controller in the behavior control system according to the embodiment of the present invention.

The controller 60 repeatedly executes processing illustrated in FIG. 11 when the automatic deceleration of the motorcycle 100 becomes necessary during the execution of the adaptive cruise operation.

(Temperature Acquisition Step)

In step S1, the temperature acquisition section 63 of the controller 60 acquires the temperature of the friction brake mechanism 29 for the front wheel 3 and the temperature of the friction brake mechanism 29 for the rear wheel 4.

(Mode Change Step)

In step S2, the mode change section 64 of the controller 60 determines whether the temperature of the friction brake mechanism 29 for the rear wheel 4 is higher than the first prescribed temperature. In step S3, the mode change section 64 of the controller 60 determines whether the temperature of the friction brake mechanism 29 for the front wheel 3 is higher than the second prescribed temperature. In step S4, the mode change section 64 of the controller 60 determines whether the temperature of the friction brake mechanism 29 for the front wheel 3 is higher than the third prescribed temperature. Note that the determination of Yes may be made or the determination of No may be made in the case where it is determined that the temperature of the friction brake mechanism 29 is equal to the prescribed temperature.

If the determination of No is made in step S2 and step S3, the mode change section 64 selects the first mode A in step S5. If the determination of Yes is made in step S2, and the determination of No is made in step S4, the mode change section 64 selects the second mode B in step S6. If the determination of No is made in step S2 and the determination of Yes is made in step S3, the mode change section 64 selects the third mode C in step S7. If the determination of Yes is made in step S2 and step S4, the mode change section 64 selects the fourth mode D in step S8.

(Control Amount Setting Step)

In step S9, the control amount setting section 65 of the controller 60 sets the control amount for generating the desired braking force on each of the friction brake mechanism 29 for the rear wheel 4 and the friction brake mechanism 29 for the front wheel 3 in accordance with the selected mode in steps S5 to S8.

(Execution Step)

In step S10, the execution section 66 of the controller 60 operates each of the components of the behavior control system 10 in the control amount set in step S9, and makes the motorcycle 100 execute the automatic deceleration.

The description has been made so far on the embodiment. However, the present invention is not limited to the description of the embodiment. For example, only a part of the embodiment may be implemented, or an order of the steps may be changed.

For example, in the embodiment, the description has been made on the case where the temperature-dependent mode change is made during the automatic deceleration in the adaptive cruise operation. However, the temperature-dependent mode change may be made during the automatic deceleration in the automatic cruise operation other than the adaptive cruise operation.

REFERENCE SIGNS LIST

1: Trunk
2: Handlebar
3: Front wheel
3a: Rotor
4: Rear wheel
4a: Rotor
10: Behavior control system
11: Front brake operation section
12: Front-wheel brake mechanism
13: Rear brake operation section
14: Rear-wheel brake mechanism
21: Master cylinder
22: Reservoir
23: Brake caliper
24: Wheel cylinder
25: Brake pad
26: Primary channel
27: Secondary channel
28: Supply channel
29: Friction brake mechanism
30: Speed sensor
31: Inlet valve
32: Outlet valve
33: Accumulator
34: Pump
35: First valve
36: Second valve
41: Master-cylinder pressure sensor
42: Wheel-cylinder pressure sensor
43: Front-wheel rotational frequency sensor
44: Rear-wheel rotational frequency sensor
45: Distance measurement sensor
46: Image sensor
50: Hydraulic pressure control unit
51: Base body
60: Controller
61: Follow-up vehicle identification section
62: Vehicle position information acquisition section
63: Temperature acquisition section
64: Mode change section
65: Control amount setting section
66: Execution section
100: Motorcycle

The invention claimed is:

1. A controller (60) for controlling behavior of a motorcycle (100), the controller comprising:
a control amount setting section (65) that sets a control amount in automatic cruise operation; and
an execution section (66) that makes the motorcycle (100) execute the automatic cruise operation corresponding to the control amount set in the control amount setting section (65), and further comprising:
a mode change section (64) that changes a mode to a first mode (A) in a state where a temperature of a rear-wheel friction brake mechanism as a friction brake mechanism (29) for a rear wheel (4) of the motorcycle (100) is lower than a first prescribed temperature or to a second mode (B) in a state where the temperature of the rear-wheel friction brake mechanism is higher than the first prescribed temperature during automatic deceleration in the automatic cruise operation, wherein the control amount setting section (65) changes the control amount in accordance with the mode change in the mode change section (64), and in the case where a braking force generated on the rear wheel (4) in the first mode (A) and the braking force generated on the rear wheel (4) in the second mode (B) are compared under a condition that the same deceleration is generated in the motorcycle (100) by the automatic deceleration, in a state where the deceleration is at least less than a first reference amount, the braking force generated on the rear wheel (4) in the second mode (B) is smaller than the braking force generated on the rear wheel (4) in the first mode (A).

2. The controller according to claim 1, wherein in the case where a ratio of the braking force generated on the rear wheel (4) in the first mode (A) to the braking force generated on the rear wheel (4) in the second mode (B) is defined as a first ratio under the condition that the same deceleration is generated in the motorcycle (100) by the automatic deceleration, the first ratio in a state where the deceleration is greater than the first reference amount is less than the first ratio in a state where the deceleration is less than the first reference amount.

3. The controller according to claim 1, wherein during the automatic deceleration in the automatic cruise operation, the mode change section (64) changes the mode to the first mode (A) in a state where the temperature of the rear-wheel friction brake mechanism is lower than the first prescribed temperature and a temperature of a front-wheel friction brake mechanism that is the friction brake mechanism (29) for the front wheel (3) in the motorcycle (100) is lower than a second prescribed temperature, and changes the mode to a third mode (C) in a state where the temperature of the rear-wheel friction brake mechanism is lower than the first prescribed temperature and the temperature of the front-wheel friction brake mechanism is higher than the second prescribed temperature, and in the case where a braking force generated on the front wheel (3) in the first mode (A) and the braking force generated on the front wheel (3) in the third mode (C) are compared under the condition that the same deceleration is generated in the motorcycle (100) by the automatic deceleration, in a state where at least the deceleration is less than a second reference amount, the braking force generated on the front wheel (3) in the third mode (C) is smaller than the braking force generated on the front wheel (3) in the first mode (A).

4. The controller according to claim 3, wherein in the case where a ratio of the braking force generated on the front wheel (3) in the first mode (A) to the braking force generated on the front wheel (3) in the third mode (C) is defined as a second ratio under the condition that the same deceleration is generated in the motorcycle (100) by the automatic deceleration, the second ratio in a state where the deceleration is greater than the second reference amount is less than the second ratio in a state where the deceleration is less than the second reference amount.

5. The controller according to claim 1, wherein during the automatic deceleration in the automatic cruise operation, the mode change section (64) changes the mode to the second mode (B) in a state where the temperature of the rear-wheel friction brake mechanism is higher than the first prescribed temperature and the temperature of the front-wheel friction brake mechanism that is the friction brake mechanism (29) for the front wheel (3) in the motorcycle (100) is lower than a third prescribed temperature, and changes the mode to a fourth mode (D) in a state where the temperature of the rear-wheel friction brake mechanism is higher than the first prescribed temperature and the temperature of the front-wheel friction brake mechanism is higher than the third prescribed temperature, and in the case where the braking force generated on the front wheel (3) in the second mode (B) and the braking force generated on the front wheel (3) in the fourth mode (D) are compared under the condition that the same deceleration is generated in the motorcycle (100) by the automatic deceleration, in a state where at least the deceleration is less than a third reference amount, the braking force generated on the front wheel (3) in the fourth mode (D) is smaller than the braking force generated on the front wheel (3) in the second mode (B).

6. The controller according to claim 5, wherein in the case where a ratio of the braking force generated on the front wheel (3) in the second mode (B) to the braking force generated on the front wheel (3) in the fourth mode (D) is defined as a third ratio under the condition that the same deceleration is generated in the motorcycle (100) by the automatic deceleration, the third ratio in a state where the deceleration is greater than the third reference amount is less than the third ratio in a state where the deceleration is less than the third reference amount.

7. A control method for controlling behavior of a motorcycle (100), the control method comprising:

a control amount setting step (S9) to set a control amount in automatic cruise operation; and an execution step (S10) to make the motorcycle (100) execute the automatic cruise operation that corresponds to the control amount set in the control amount setting step (S9), and further comprising:

a mode change step (S2 to S8) to change a mode to a first mode (A) in a state where a temperature of a rear-wheel friction brake mechanism as a friction brake mechanism (29) for a rear wheel (4) of the motorcycle (100) is lower than a first prescribed temperature or to a second mode (B) in a state where the temperature of the rear-wheel friction brake mechanism is higher than the first prescribed temperature during automatic deceleration in the automatic cruise operation, wherein in the control amount setting step (S9), the control amount is changed in accordance with the mode change in the mode change step (S2 to S8), and in the case where a braking force generated on the rear wheel (4) in the first mode (A) and the braking force generated on the rear wheel (4) in the second mode (B) are compared under a condition that the same deceleration is generated in the motorcycle (100) by the automatic deceleration, in a state where at least the deceleration is less than a first reference amount, the braking force generated on the rear wheel (4) in the second mode (B) is smaller than the braking force generated on the rear wheel (4) in the first mode (A).

\* \* \* \* \*